United States Patent [19]

Sander et al.

[11] Patent Number: 4,691,622
[45] Date of Patent: Sep. 8, 1987

[54] LIGHT ALLOY PISTON

[75] Inventors: Wilfried Sander, Neckarsulm; Gunder Essig; Erich Wacker, both of Heilbronn, all of Fed. Rep. of Germany

[73] Assignee: Metallgesellschaft Aktiengesellschaft, Frankfurt am Main, Fed. Rep. of Germany

[21] Appl. No.: 785,319

[22] Filed: Oct. 7, 1985

[30] Foreign Application Priority Data

Oct. 10, 1984 [DE] Fed. Rep. of Germany ....... 3437111

[51] Int. Cl.$^4$ ................................................ F16J 1/04
[52] U.S. Cl. ..................................................... 92/233
[58] Field of Search ................. 92/173, 174, 175, 177, 92/DIG. 1, DIG. 2, 233; 123/193 P

[56] References Cited

U.S. PATENT DOCUMENTS

| 1,758,444 | 5/1930 | Jehle et al. | 92/233 |
| 3,319,535 | 5/1967 | Holcombe | 92/233 |
| 4,178,899 | 12/1980 | Julich | 123/193 P |
| 4,314,531 | 2/1982 | Bruni | 123/193 P |
| 4,535,682 | 8/1985 | Collyear et al. | 123/193 P |

FOREIGN PATENT DOCUMENTS 2105439 3/1983 United Kingdom ............ 123/193 P

Primary Examiner—Edward K. Look
Attorney, Agent, or Firm—Sprung Horn Kramer & Woods

[57] ABSTRACT

In a light alloy piston each of the load-carrying skirt surfaces is divided by a depression into two load-carrying partial shaft surfaces.

In order to reduce the friction losses and the consumption of lubricant the depth of the depression (8, 9) between the tapered portions of the curved generatrix (7) at the top and bottom ends of the skirt is approximately twice the peak-to-valley height of the machined surface of the skirt (1). The load-carrying partial skirt surfaces (10, 11, 12, 13) and the depression (8, 9) are at least as wide as the wear pattern area, and the axial extent of the depression (8, 9) is so selected that the depression will not protrude from the cylinder when the piston is at its lower dead center and in the cold engine the load-carrying partial skirt surfaces (10, 11, 12, 13) have between the upper limit of the depression and the lower limit of the tapered portion of the curved generatrix (7) at top end of the skirt an axially parallel portion in a height of 1.5 to 4.5 mm, preferably 1.5 to 2.5 mm.

10 Claims, 2 Drawing Figures

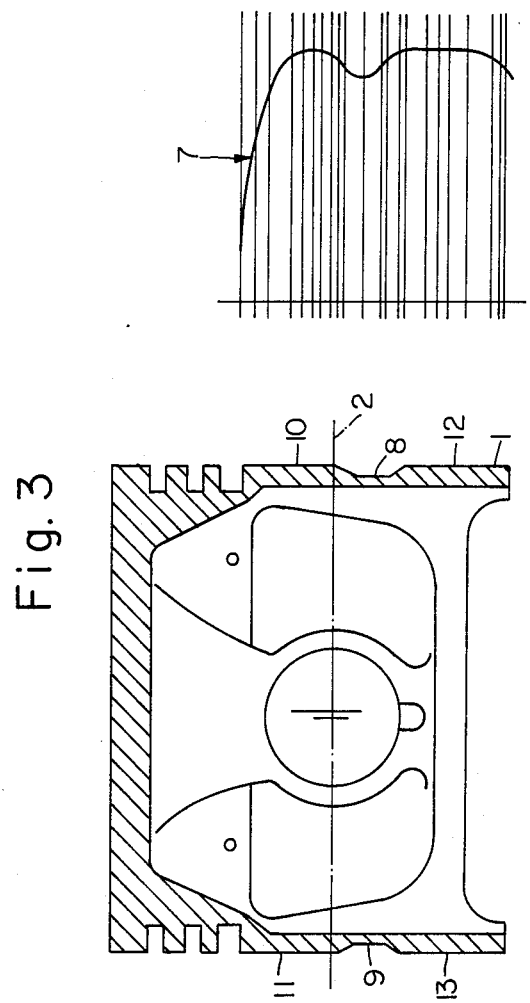

LIGHT ALLOY PISTON

BACKGROUND OF THE INVENTION

This invention relates to a light alloy piston for internal combustion engines, which piston has a cambered oval external shape and has load-carrying skirt surfaces each of which is divided into two load-carrying partial skirt surfaces by a peripherally extending depression.

At the present time, almost all light alloy pistons for internal combustion engines have a sliding surface which has been machined to a predetermined shape in consideration of the thermal and mechanical conditions arising during the operation of the engine. For this reason pistons of all sizes and types have been provided with a large number of cambered oval external shapes with the object to minimize the running clearance while retaining a high seizure-proofness. The cambered shape of the piston in the cold is due to a curved generatrix of the skirt of the piston. Such a curved generatrix is required for a compensation of the temperature pattern along the piston skirt by the resulting expansion. Owing to the relatively high temperature resulting at the top end of the piston skirt during the operation of the engine and in order to ensure good lubricating conditions, i.e., the formation of a lubricant wedge, that curved generatrix is strongly tapered at said top end whereas it is slightly curved in the middle. In consideration of the lubricating conditions that curved generatrix may also be slightly tapered or may be straight at the bottom end of the skirt.

Owing to the ovalness of the piston skirt having a minor axis in the direction of the axis of the piston pin, the temperature-dependent increases of the volume and girth of the piston are deflected in the axial direction of the piston pin and deformations of the skirt which are due to the force exerted on the sliding surface will be taken up. The piston skirt must have an ovalness reserve even when it is fully stressed during the operation of the engine. Because the connecting rod performs a pivotal movement, which results at the sliding surface in the exertion of a variable force that is due to the resolution of the gas force and acts in a direction that is at right angles to the axis of the piston pin, the piston carries load during the operation of the engine mainly in the regions which are on both sides of the pressure-backpressure plane which includes the axis of the piston pin and extends at right angles thereto in the so-called pressure-backpressure direction. In said regions the formation of a hydrodynamic lubricant film is not ensured throughout the stroke of the piston so that mixed friction between the piston and the cylinder surface occurs near the top and bottom dead centers. As a result, a wear mark which is generally described as a wear pattern having approximately parabolic lateral boundary lines is formed on the pressure and backpressure sides of the piston skirt. Said boundary lines extend on each side of the pressure-backpressure plane over up to 45° in each half of the piston skirt. In a piston designed in consideration of the above aspects, the piston skirt is caused to contact the cylinder surface over an area which is as large as possible in order to ensure that the lateral forces will be taken up. The mixed friction which is apparent from the wear pattern of the piston skirt and the hydrodynamic friction which occurs between the piston and the cylinder wall and is due to shearing forces exerted on the lubricant film by the relatively sliding members which are not in direct contact with each other result in friction losses, which may amount to as much as 15% of the total power of the internal combustion engine. Whereas the forces which are due to hydrodynamic friction are generally smaller than the forces which are due to mixed friction, the former account for a major share of the friction loss because the velocity of the sliding piston results in an occurrence of hydrodynamic lubrication during a major part of the stroke. As the hydrodynamic friction is approximately proportional to the surface area of the load-carrying lubricant film, a decrease of the load-carrying skirt area may result in an increase of the power of the internal combustion engine and/or in a saving of fuel.

For instance, it has been proposed in the periodical Kraftfahrzeugtechnik, No. 12, 1976, Berlin, on pages 364 to 367, to reduce the friction at the piston skirt in that each load-carrying skirt surface is divided into two load-carrying surfaces by the provision of respective slide rings near the top and bottom ends of the skirt. Published German Application No. 32 28 982 discloses a piston in which the piston is provided on both sides of the pressure-backpressure plane with one or with a plurality of separate, relatively small bearing surfaces, which are in contact with the cylinder surface. The edge portions of the bearing surfaces are so designed that the lubricant will be conducted to the associated bearing surface and between the piston and the cylinder surface. Just as in the piston disclosed in the periodical Kraftfahrzeugtechnik, No. 12, 1976, that design results under full load in a higher pressure per unit of area so that the wear will be increased and seizure may occur because a contact can be established only at discrete bearing surfaces and reserve bearing surfaces are not provided. Even when the bearing surfaces are so dimensioned that a satisfactory function is ensured under normal operating conditions, there may be a seizure and premature wear at the bearing surfaces under an overload or under undesirable lubricating conditions as may sometimes arise in practice.

MTZ Motortechnische Zeitschrift 40 (1979), 10 discloses on page 462 a production piston in which the load-carrying skirt surface has been reduced by about 59% by the provision of a ground clearance surface in the direction of the pin axis and by an annular recess. Whereas this results in a reduction of the fuel consumption by about 6% at 50 km/h, it involves an undesired higher consumption of lubricant and adversely affects the guidance of the piston.

SUMMARY OF THE INVENTION

It is an object of the invention to reduce the friction losses and the lubricant consumption of a light alloy piston of the type described first hereinbefore whereas the other functions of the piston are preserved.

That object is accomplished in that the depth of the depression between the tapered portions of the curved generatrix at the top and bottom ends of the skirt is approximately twice the peak-to-valley height of the machined profiled surface of the skirt. The load-carrying partial skirt surfaces and the depression are at least as wide as the wear pattern area, and the axial extent of the depression in an upward and downward direction is so selected that the depression will not protrude from the cylinder when the piston is at its lower dead center and in the cold engine the load-carrying partial skirt surfaces have between the upper limit of the depression and the lower limit of the tapered portion of the curved generatrix at top end of the skirt an axially parallel portion in a height of 1.5 to 4.5 mm, preferably 1.5 to 2.5 mm. With that design of the piston skirt, an improved floating on the lubricant film is ensured so that the friction losses will distinctly be reduced and the sliding conditions will be improved. Owing to its relatively small depth the depression constitutes an excellent lubricant reservoir, which contributes to the maintenance of hydrodynamic lubrication on the load-carrying partial skirt surfaces. A special advantage resides in that the pressure per unit of area will not increase with the load. This is due to the fact that the load-carrying partial skirt surfaces contact the cylinder surface only in relatively small areas under partial load and the width of said areas progressively increases with the load so that they subtend an angle of as much as 90° in each half of the piston skirt. The necessary straight guidance of the piston in the cylinder is ensured under all operating conditions.

In accordance with a preferred feature of the invention the machined profiled surface of the piston skirt has a peak-to-valley height of 5 to 10 μm, preferably 5 to 7 μm, so that the depression has a depth of 10 to 20 μm, preferably 10 to 14 μm. The depth of the depression should not exceed the upper limit stated in order to avoid an accumulation of an excessive amount of lubricant in the depression as such accumulation would adversely affect the control of the lubricant. A depth of the depression in excess of the lower limit stated will ensure that the depression will perform its intended function to interrupt the continuous lubricant film between the load-carrying partial skirt surfaces even when the machined profiled surface has suffered a certain wear.

The transitions between the depressions and the adjoining upper and lower load-carrying partial skirt surfaces are preferably rounded. That design will ensure that no upwardly facing shoulder having a sharp edge will be formed when the machined surface has suffered a certain wear after a prolonged operation of the piston because such edge could adversely affect the consumption of lubricant.

The width of the load-carrying partial skirt surfaces and of the depression should not substantially exceed the width of the wear pattern area. That width is defined by the provision of cast or ground or milled clearance surfaces, which are set back from the envelope of the skirt and are provided adjacent to the piston pin bosses on both sides of the horizontal plane including the axis of the piston pin.

It has been found that the features of the invention can be embodied to special advantage in a light alloy piston in which the outer ends of the piston pin bosses are set back from the envelope of the skirt and are spaced apart by a distance amounting to 60 to 80%, preferably to 65 to 75%, of the piston diameter, and in which the width of the load-carrying skirt surfaces and of the depressions amounts to 70 to 90% of the piston diameter.

The invention can preferably be embodied in a light alloy piston in which the skirt generatrix has only a relatively small setback in its top portion and which comprises in said top portion a steel ring, which is embedded in the piston casting between the piston pin bosses and the lowermost ring groove, and in which the piston head is separated from the skirt on each of the pressure and backpressure sides by means of a transverse slot, which subtends an angle of 90 to 120 degrees.

The invention is illustrated by way of example in the drawing and will now be explained more in detail.

DETAILED DESCRIPTION OF THE INVENTION

Figure 1:
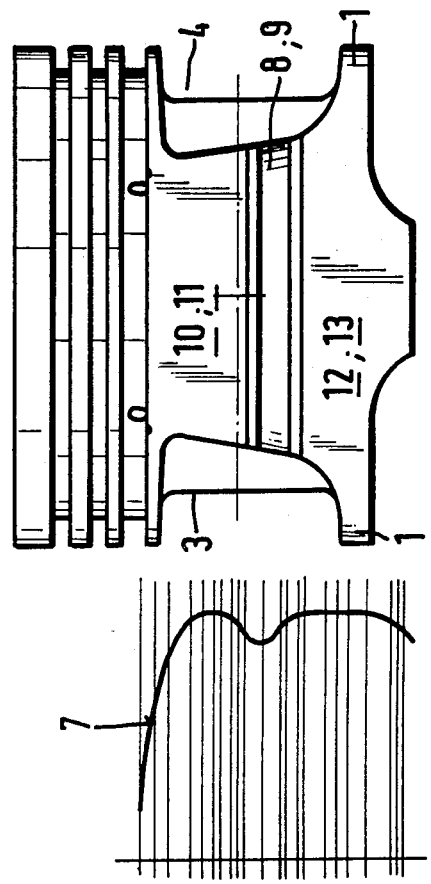
FIG. 1 is a side elevation of the piston viewed in the direction of the piston pin axis and the associated skirt generatrix.
Figure 2:
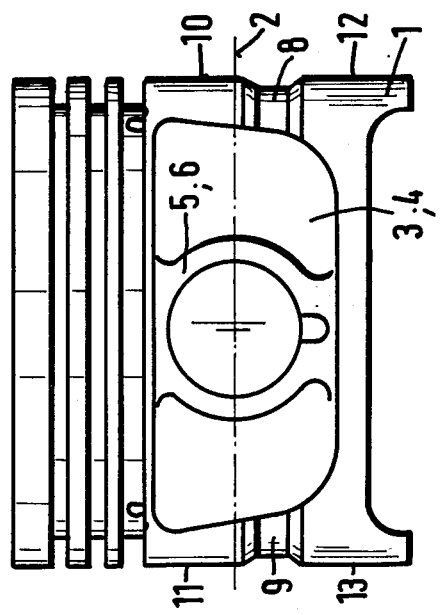
FIG. 2 is a side elevation showing the piston in a view on the pressure or backpressure side.

On both sides of the horizontal plane 2 containing the axis of the piston pin, the skirt 1 is set back along chords relative to the envelope of the skirt so that recesses 3, 4 are obtained and the piston pin bosses 5, 6 are substantially set back toward the center. The distance between the outer ends of the piston pin bosses 5, 6 amounts only to 70% of the piston diameter, and the inserted piston pin has an overall length amounting to 65% of the piston diameter. The skirt 1 is circular at its bottom end. The piston has a cambered oval outside surface having a generatrix 7, which has a larger setback at the top end of the skirt 1 than at its lower end. Below the horizontal plane 2 including the axis of the piston pin that surface is formed with peripherally extending depressions 8 and 9, which have a depth of 18 μm and merge with rounded transitions into the adjoining load-carrying partial skirt surfaces 10, 11, 12, 13. The depth of said depressions 8 and 9 is highly exaggerated in FIG. 1.

We claim:

1. In a light alloy piston for internal combustion engines, having a cambered oval external shape and load-carrying skirt surfaces each of which is divided into two load-carrying partial skirt surfaces by peripherally extending depression, the improvement wherein: the depth of the depression (8,9) between the tapered portions of a curved generatrix (7) at the top and bottom ends of the skirt is approximately twice the peak-to-valley height of a machined profiled surface of the skirt (1), the axial extent of the depression (8,9) in an upward and downward direction is so selected that the depression will not protrude from the cylinder when the piston is at its lower dead center and in the cold engine the load-carrying partial skirt surfaces (10, 11, 12, 13) have between the upper limit of the depression and the lower limit of the tapered portion of the curved generatrix (7) at top end of the skirt an axially parallel portion at a height of 1.5 to 4.5 mm and the load-carrying partial skirt surfaces (10, 11, 12, 13) and the depression (8,9) are at least as wide as the wear pattern area.

2. The light alloy piston according to claim 1, wherein the machined profiled surface of the piston skirt (1) has a peak-to-valley height of 5 to 10 μm.

3. The light alloy piston according to claim 2, wherein the machined profile surface of the piston skirt has a peak-to-valley height of 5 to 7 μm.

4. The light alloy piston according to claim 1, wherein transitions between the depressions (8,9) and the adjoining upper and lower load-carrying partial skirt surfaces (10, 11, 12, 13) are rounded.

5. The light alloy piston according to claim 1, wherein the width of the load-carrying partial skirt surfaces (10, 11, 12, 13) and the depressions (8,9) does not substantially exceed the width of the wear pattern area and said width is defined by the provisions of clearance surfaces, which are set back from the envelope of the skirt and are provided adjacent to piston pin bosses on both sides of the horizontal plane including the axis of a piston pin.

6. The light alloy piston according to claim 5, wherein the outer ends of the piston pin bosses are spaced apart by a distance amounting 65 to 75% of the piston diameter.

7. The light alloy piston according to claim 1, wherein the lower load-carrying partial shaft surfaces (12,13) are wider than the upper load-carrying partial shaft surfaces (10,11).

8. The light alloy piston according to claim 1, wherein the outer ends of the piston pin bosses (5,6) are set back from the envelope of the skirt and are spaced apart by a distance amounting to 60 to 80% of the piston diameter, and wherein the width of the load carrying skirt surfaces (10, 11, 12, 13) and of the depressions (8,9) amounts to 70 to 90% of the piston diameter.

9. The light alloy piston according to claim 1, further comprising piston pin bosses and a lowermost ring groove and wherein the top portion of the piston skirt has a steel ring inserted between the piston pin bosses and the lowermost ring groove and a transverse slot separates the piston head from the skirt on each of the pressure and backpressure side and subtends an angle of 90° to 120° C.

10. The light alloy piston according to claim 1, wherein the load-carrying partial skirt surfaces have the axially parallel portion at a height of 1.5 to 2.5 mm.

* * * * *